(12) United States Patent
Fujiwara et al.

(10) Patent No.: US 7,570,252 B2
(45) Date of Patent: Aug. 4, 2009

(54) PEN INPUT/DISPLAY DEVICE

(75) Inventors: Koji Fujiwara, Tenri (JP); Naoto Inoue, Kashihara (JP); Yasunori Ake, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 652 days.

(21) Appl. No.: 10/820,095

(22) Filed: Apr. 8, 2004

(65) Prior Publication Data

US 2004/0201580 A1  Oct. 14, 2004

(30) Foreign Application Priority Data

Apr. 9, 2003 (JP) .............................. 2003-105448

(51) Int. Cl.
*G09G 5/00* (2006.01)
(52) U.S. Cl. .................. 345/177; 345/173; 345/174; 345/175; 345/176; 345/178; 345/179; 178/18.04; 178/18.01
(58) Field of Classification Search .............. 178/19.02, 178/19.03, 18.01, 18.02, 18.03, 18.04, 19.05, 178/20.01; 345/157, 158, 159, 176, 177, 345/179; 382/187
See application file for complete search history.

(56) References Cited

U.S. PATENT DOCUMENTS

| | | | | |
|---|---|---|---|---|
| 4,654,648 A | * | 3/1987 | Herrington et al. | ........... 345/179 |
| 4,814,552 A | * | 3/1989 | Stefik et al. | ............. 178/19.02 |
| 5,308,936 A | * | 5/1994 | Biggs et al. | ............. 178/19.02 |
| 5,459,489 A | * | 10/1995 | Redford | ....................... 345/179 |
| 5,526,023 A | * | 6/1996 | Sugimoto et al. | ........... 345/173 |
| 5,594,215 A | * | 1/1997 | Jeng | ......................... 178/18.07 |
| 5,717,168 A | * | 2/1998 | DeBuisser et al. | ....... 178/18.04 |
| 6,104,387 A | * | 8/2000 | Chery et al. | ................. 345/179 |
| 6,184,873 B1 | * | 2/2001 | Ward et al. | ................... 345/179 |
| 6,208,330 B1 | * | 3/2001 | Hasegawa et al. | ........... 345/173 |
| 6,288,711 B1 | * | 9/2001 | Tanaka et al. | ............... 345/179 |
| 6,470,341 B1 | * | 10/2002 | Rekimoto | ..................... 707/10 |
| 6,529,189 B1 | * | 3/2003 | Colgan et al. | ............... 345/179 |

(Continued)

FOREIGN PATENT DOCUMENTS

JP  59-220888 A  12/1984

(Continued)

*Primary Examiner*—Richard Hjerpe
*Assistant Examiner*—Grant D Sitta
(74) *Attorney, Agent, or Firm*—Birch, Stewart, Kolasch & Birch, LLP

(57) ABSTRACT

When a display panel is in contact with the pen tip of an input pen, an infrared receiver and at least two ultrasonic receivers, provided on the display panel, receive respectively an infrared signal and an ultrasonic signal simultaneously transmitted from an infrared transmitter and an ultrasonic transmitter, and computes the contact position of the pen tip on the display panel from a result, containing a time delay, of the ultrasonic receiver receiving the ultrasonic signal with reference to a time when infrared signal is received. The input pen includes a piezoelectric element sensing pen pressure when the pen tip is in contact with the display panel and a microcomputer controlling a infrared transmitter to transmit an infrared signal which changes in accordance with the pen pressure. Thus, in ultrasonic pen input operation, information on the sensed pen pressure is wirelessly transmitted to the device main body, so as to provide a pen input/display device realizing multifunctional, high performance pen input operation based on the pen pressure information in a simple manner.

9 Claims, 16 Drawing Sheets

U.S. PATENT DOCUMENTS

| | | | |
|---|---|---|---|
| 6,628,270 B2 * | 9/2003 | Sekiguchi et al. | 345/173 |
| 6,703,570 B1 * | 3/2004 | Russell et al. | 178/19.03 |
| 6,822,641 B2 * | 11/2004 | Shenholz et al. | 345/177 |
| 7,383,297 B1 * | 6/2008 | Atsmon et al. | 709/200 |
| 7,489,308 B2 * | 2/2009 | Blake et al. | 345/179 |
| 2004/0032399 A1 * | 2/2004 | Sekiguchi et al. | 345/173 |

FOREIGN PATENT DOCUMENTS

| | | |
|---|---|---|
| JP | 61-107419 A | 5/1986 |
| JP | 63-136128 A | 6/1988 |
| JP | 2002-312113 A | 10/2002 |

* cited by examiner

FIG. 5 (a)

INFRARED LIGHT TRANSMISSION
WAVEFORM (DIGITAL),
LOW PEN PRESSURE

FIG. 5 (b)

INFRARED LIGHT TRANSMISSION
WAVEFORM (DIGITAL),
INTERMEDIATE PEN PRESSURE

FIG. 5 (c)

INFRARED LIGHT TRANSMISSION
WAVEFORM (DIGITAL),
HIGH PEN PRESSURE

FIG. 6 (a)

PEN PRESSURE INFO.

INFRARED LIGHT
TRANSMISSION WAVEFORM/
INFRARED LIGHT RECEPTION
WAVEFORM (DIGITAL),

FIG. 6 (b)

ULTRASONIC SOUND
RECEPTION WAVEFORM
(DIGITAL)

TRAVEL TIME
DIFFERENCE

FIG. 7 (a)

INFRARED LIGHT TRANSMISSION
WAVEFORM (DIGITAL),
LOW PEN PRESSURE

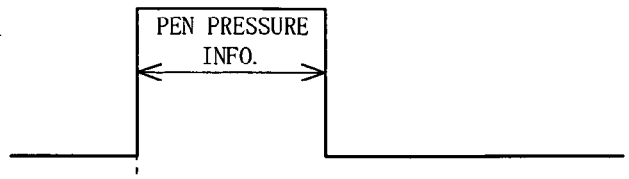

FIG. 7 (b)

INFRARED LIGHT TRANSMISSION
WAVEFORM (DIGITAL),
INTERMEDIATE PEN PRESSURE

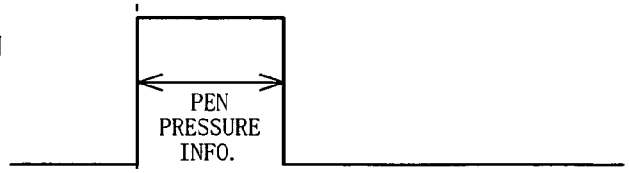

FIG. 7 (c)

INFRARED LIGHT TRANSMISSION
WAVEFORM (DIGITAL),
HIGH PEN PRESSURE

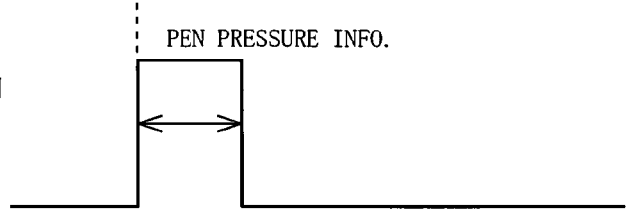

FIG. 8 (a)

INFRARED LIGHT TRANSMISSION
WAVEFORM (DIGITAL),
LOW PEN PRESSURE

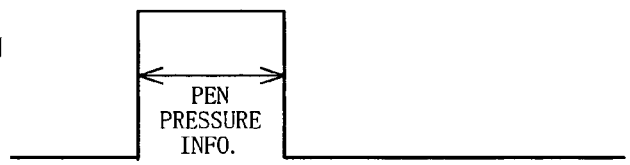

FIG. 8 (b)

INFRARED LIGHT TRANSMISSION
WAVEFORM (DIGITAL),
INTERMEDIATE PEN PRESSURE

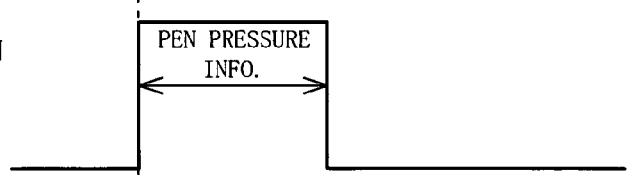

FIG. 8 (c)

INFRARED LIGHT TRANSMISSION
WAVEFORM (DIGITAL),
HIGH PEN PRESSURE

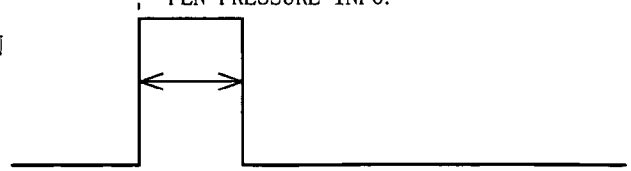

INFRARED LIGHT
TRANSMISSION WAVEFORM/
INFRARED LIGHT RECEPTION
WAVEFORM (DIGITAL)

ULTRASONIC SOUND
RECEPTION WAVEFORM
(DIGITAL)

INFRARED LIGHT TRANSMISSION
WAVEFORM (DIGITAL),
LOW PEN PRESSURE

INFRARED LIGHT TRANSMISSION
WAVEFORM (DIGITAL),
INTERMEDIATE PEN PRESSURE

INFRARED LIGHT TRANSMISSION
WAVEFORM (DIGITAL),
HIGH PEN PRESSURE

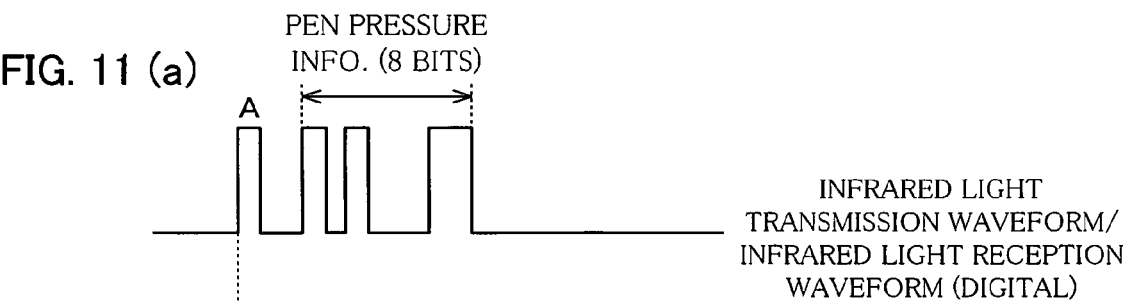
FIG. 11 (a) — INFRARED LIGHT TRANSMISSION WAVEFORM/ INFRARED LIGHT RECEPTION WAVEFORM (DIGITAL)
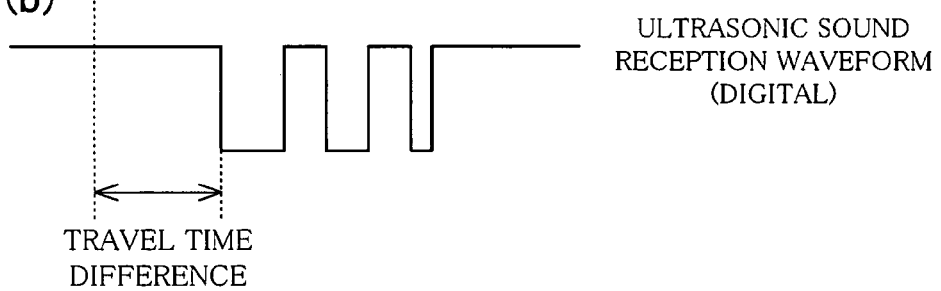
FIG. 11 (b) — ULTRASONIC SOUND RECEPTION WAVEFORM (DIGITAL)
TRAVEL TIME DIFFERENCE
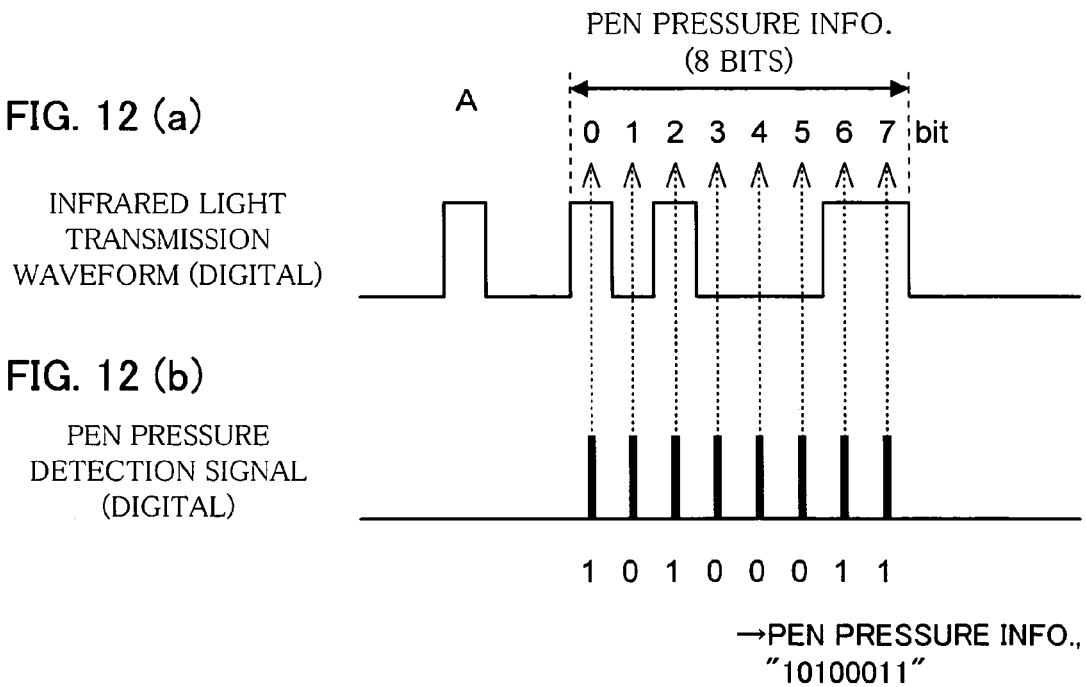
FIG. 12 (a) INFRARED LIGHT TRANSMISSION WAVEFORM (DIGITAL)
FIG. 12 (b) PEN PRESSURE DETECTION SIGNAL (DIGITAL)
1 0 1 0 0 0 1 1
→PEN PRESSURE INFO., "10100011"

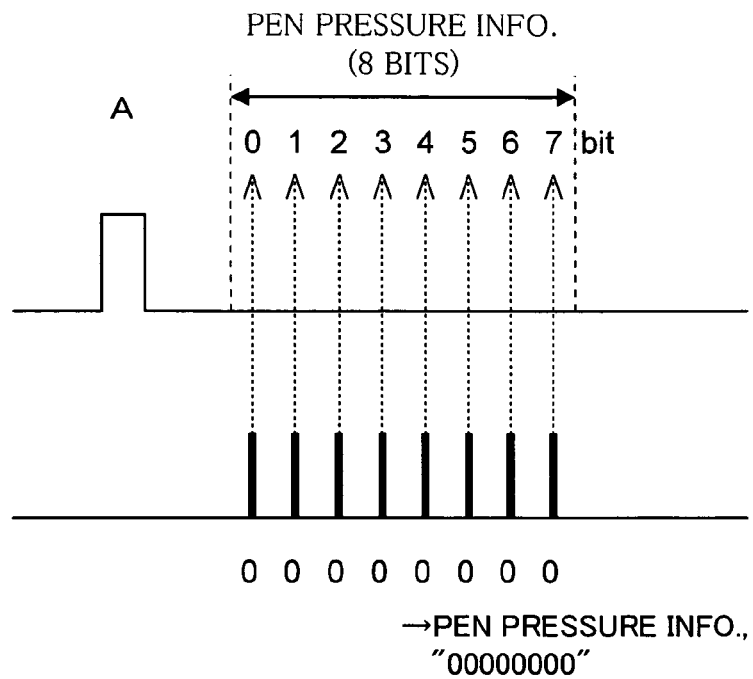
FIG. 13 (a) INFRARED LIGHT TRANSMISSION WAVEFORM (DIGITAL)
FIG. 13 (b) PEN PRESSURE DETECTION SIGNAL (DIGITAL)
→PEN PRESSURE INFO., "00000000"
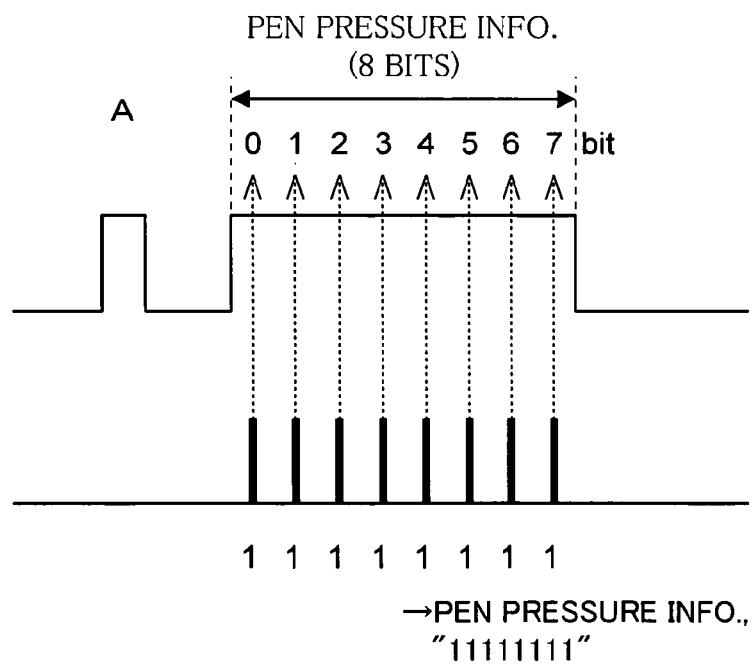
FIG. 14 (a) INFRARED LIGHT TRANSMISSION WAVEFORM (DIGITAL)
FIG. 14 (b) PEN PRESSURE DETECTION SIGNAL (DIGITAL)
→PEN PRESSURE INFO., "11111111"

FIG. 15 (a)

INFRARED LIGHT TRANSMISSION
WAVEFORM (DIGITAL),
8 GRAYSCALE LEVELS

PULSE WIDTH REQUIRED
TO TRANSMIT ENTIRE PEN
PRESSURE INFO.

FIG. 15 (b)

INFRARED LIGHT TRANSMISSION
WAVEFORM (DIGITAL),
16 GRAYSCALE LEVELS

FIG. 15 (c)

INFRARED LIGHT TRANSMISSION
WAVEFORM (DIGITAL),
32 GRAYSCALE LEVELS

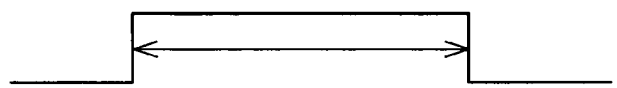

FIG. 16 (a)

INFRARED LIGHT TRANSMISSION
WAVEFORM (DIGITAL),
8 GRAYSCALE LEVELS

PULSE-TO-PULSE INTERVAL
REQUIRED TO TRANSMIT
ENTIRE PEN PRESSURE INFO.

FIG. 16 (b)

INFRARED LIGHT TRANSMISSION
WAVEFORM (DIGITAL),
16 GRAYSCALE LEVELS

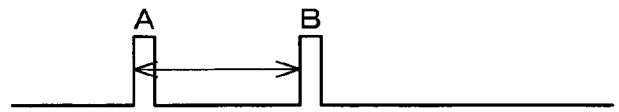

FIG. 16 (c)

INFRARED LIGHT TRANSMISSION
WAVEFORM (DIGITAL),
32 GRAYSCALE LEVELS

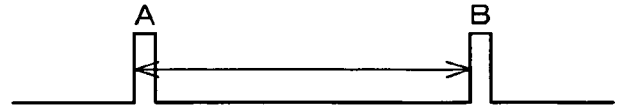

INFRARED LIGHT TRANSMISSION
WAVEFORM (DIGITAL),
8 GRAYSCALE LEVELS (3 BITS)

BIT SIGNAL PULSE WIDTH
REQUIRED TO TRANSMIT
ENTIRE PEN PRESSURE INFO.

INFRARED LIGHT TRANSMISSION
WAVEFORM (DIGITAL),
16 GRAYSCALE LEVELS (4 BITS)

INFRARED LIGHT TRANSMISSION
WAVEFORM (DIGITAL),
32 GRAYSCALE LEVELS (5 BITS)

PEN INPUT/DISPLAY DEVICE

This Nonprovisional application claims priority under 35 U.S.C. § 119(a) on Patent Application No. 2003-105448 filed in Japan on Apr. 9, 2003, the entire contents of which are hereby incorporated by reference.

FIELD OF THE INVENTION

The present invention relates to pen input/display devices capable of sensing an input position from positional information supplied from input means and showing a position image at the sensed position.

BACKGROUND OF THE INVENTION

Many conventional pen input/display devices adopt a tablet-integrated display panel (display panel integrated with a transparent tablet) to enable pen input on the display screen. There are various types of tablet-integrated display panels; the most popular among them are those with a transparent tablet operating in a resistor film scheme. In such a display panel integrated with a transparent tablet operating in a resistor film scheme, the transparent tablet is placed in front of the display panel to sense coordinates.

So, in the tablet-integrated display panel, the transparent tablet is sandwiched between the display panel and an input pen tip in pen input operation. The structure gives rise to a problem of "parallax" where the pen tip exists away from the display position on the display panel. Another problem is that the transparent tablet, although transparent, lowers the surface brightness of the display screen for it is placed on the display panel.

These problems are addressed by ultrasonic pen input scheme which allows pen input with no transparent tablet being placed on the display panel. In the scheme, an ultrasonic transmitter is provided in the input pen and sends ultrasonic sound to a receiver on the display panel. The relative position of the input pen to the display panel is computed from the received information so as to obtain the input position. Specifically, a distance is calculated according to counter scheme where the time which ultrasonic sound from an ultrasonic transmitter takes to reach a receiver is measured in terms of clock counts, and the distance is calculated based on the time measurement and the speed of sound.

The ultrasonic pen input scheme is disclosed in, for example, U.S. Pat. No. 4,814,552 (issued Mar. 21, 1989).

Now, the ultrasonic pen input scheme is described in more detail with reference to FIG. 18 through FIG. 21.

The U.S. patent is shown in FIG. 18(a). A pen input unit 101 is placed near a display panel 100. On the pen input unit 101 are two ultrasonic receivers 102, 103 and an infrared receiver 104. An input pen 120, shown in FIG. 18(b), is equipped with an ultrasonic transmitter 121 and an infrared transmitter 122. The input pen 120 has a pen tip 123 acting as a switch 124.

Moving on to FIG. 19, the input pen 120 contains: ultrasonic transmission circuitry 125 driving the ultrasonic transmitter 121; infrared transmission circuitry 126 driving the infrared transmitter 122; and a microcomputer 127 controlling outputs from the ultrasonic transmitter 121 and the infrared transmitter 122.

Under the control of the microcomputer 127, the ultrasonic transmitter 121 and the infrared transmitter 122 send a signal when the input pen 120 contacts the display panel 100, turning on the switch 124 on the pen tip 123. The ultrasonic transmitter 121, infrared transmitter 122, ultrasonic transmission circuitry 125, infrared transmission circuitry 126, and microcomputer 127 receive operational power from a built-in battery (not shown) inside the input pen 120.

Next, an input position computation method is described in accordance with the ultrasonic pen input scheme.

As the input pen 120 contacts the display panel 100, the built-in switch 124 on the pen tip 123 is turned on. Then, the ultrasonic transmitter 121 and the infrared transmitter 122 simultaneously send an ultrasonic signal and an infrared signal respectively. The ultrasonic receivers 102, 103 individually measure a signal travel time the ultrasonic signal takes to reach a receiver after leaving the transmitter. The infrared signal is regarded as taking no time to reach the infrared receiver 104 after transmission. The reception of the infrared signal triggers the measurement of the signal travel time as shown in FIG. 20.

The signal travel time of the ultrasonic signal is measurable by, for example, counter scheme. Specifically, the times which the ultrasonic signal from the ultrasonic transmitter 121 takes to reach the ultrasonic receivers 102, 103 are measured in terms of clock counts which are then multiplied by the clock cycle to obtain the signal travel times.

The signal travel times calculated in the ultrasonic receivers 102, 103 are multiplied by the propagation speed of the ultrasonic signal, that is, the sonic speed, to obtain the distance by which the ultrasonic transmitter 121 is separated from the ultrasonic receivers 102, 103 at that particular time. The distance between the ultrasonic receivers 102, 103 is known in advance.

Hence, the distance L1 between the ultrasonic transmitter 121 and the ultrasonic receiver 102, the distance L2 between the ultrasonic transmitter 121 and the ultrasonic receiver 103, and the distance L0 between the ultrasonic receiver 102 and the ultrasonic receiver 103 are now all obtained (see FIG. 21). From these three distances, the position of the ultrasonic transmitter 121 is obtained which is expressed by a set of positional coordinates (X, Y) of a point on the display panel 100. The coordinate position of the ultrasonic transmitter 121 detected in this manner is used as the pen tip coordinate position.

Next, the input position computing operation, i.e., the detected coordinate position, will be described in more detail with reference to FIG. 22 and FIG. 23.

Referring first to FIG. 22, an ultrasonic signal from the ultrasonic transmitter 121 in the input pen 120 is received by the ultrasonic receivers 102, 103 in the pen input unit 101. The incoming waveform is amplified in amplifier circuits 105, 106 and converted from analog to digital in A/D converter circuits 107, 108, before being transferred to a travel time difference count circuit 109.

Meanwhile, an infrared signal sent out from the infrared transmitter 122 simultaneously with the ultrasonic signal is received by the infrared receiver 104 in the pen input unit 101 and amplified in an amplifier circuit 110, before being transferred to the travel time difference count circuit 109 similarly to the ultrasonic signal.

The travel time difference count circuit 109 detects the signal travel times from the ultrasonic and infrared signal waveform inputs and transmits the signal travel times corresponding to the waveforms received at the ultrasonic receivers 102, 103 to detected value processing sections 111, 112 as time values A, B.

The time values A, B provided by the travel time difference count circuit 109 in the pen input unit 101 are converted to distance values A, B through computation by the detected value processing sections 111, 112 as shown in FIG. 23 and then to a set of coordinates values (X, Y) on the display panel 100 by the coordinate converter section 113, before the positional coordinates are displayed on the display panel 100 by the coordinate display section 114.

This ultrasonic pen input scheme requires no transparent tablet in front of the display panel 100, producing no parallax in pen input operation. Also, the scheme enables pen inputs while retaining high display quality with no transmittance degradation due to the transparent tablet.

Some pen input/display devices of the kind add new features to pen input operation. For example, Japanese published unexamined patent applications 59-220888 (Tokukaisho 59-220888/1984; published on Dec. 12, 1984) and 63-136128 (Tokukaisho 63-136128/1988; published on Jun. 8, 1988) disclose a drive method where pen pressure is sensed in a pen input operation. According to the drive method, a pen pressure sensor element provided on a pen senses pen pressure, and information on the pressure is transmitted to a display device, so that graphics are drawn on the display device in accordance with the pen pressure information.

Following are a few examples of graphics enabled by pen pressure information.

(1) Translating pen pressure information to line width information enables a brush-like feel.

(2) Translating pen pressure information to grayscale level information enables variations in grayscale level of the graphics in accordance with the pen pressure.

(3) Translating pen pressure information to color information enables changes in color of the graphics in accordance with the pen pressure. This technology is disclosed in Japanese published unexamined patent application 61-107419 (Tokukaisho 61-107419/1986; published on May 26, 1986).

In this manner, pen input operation which is simple, highly capable, and rich in features is realized using graphics information in conjunction with pen pressure information obtained by sensing.

As mentioned earlier, U.S. Pat. No. 4,814,552 scheme permits pen input while retaining parallax-free high display quality with no transmittance degradation. In addition, the drive scheme disclosed in Japanese published unexamined patent applications 59-220888 (Tokukaisho 59-220888/1984; published on Dec. 12, 1984), 63-136128 (Tokukaisho 63-136128/1988; published on Jun. 8, 1988), 63-136128 (Tokukaisho 63-136128/1988; published on Jun. 8, 1988, and 61-107419 (Tokukaisho 61-107419/1986; published on May 26, 1986) realizes a simple and highly capable, that is, rich-in-features, pen input operation whereby pen pressure is sent by a pen pressure sensor element provided on a pen and information on the pen pressure is transferred to the display device to draw graphics in accordance with pen pressure information.

The conventional pen input/display devices have large problems.

For example, in the schemes disclosed in Japanese published unexamined patent applications 59-220888 (Tokukaisho 59-220888/1984; published on Dec. 12, 1984) and 63-136128 (Tokukaisho 63-136128/1988; published on Jun. 8, 1988), information on a pen pressure sensed by pen pressure sensor means on a pen is transferred through a wireline to a display device.

In contrast, the ultrasonic pen input scheme disclosed in U.S. Pat. No. 4,814,552 works wirelessly, which is one of the scheme's attractions. Much of convenience and operability will be sacrificed if the pen is connected to the display device via a wireline to enable the transmission of pen pressure information to the display device.

SUMMARY OF THE INVENTION

A feature of the present invention is to offer a pen input/display device capable of wirelessly transmitting information on sensed pen pressure to a device main body in ultrasonic pen input operation, in order to realize multifunctional, high performance pen input based on the pen pressure information in a simple manner.

In accordance with an aspect of the invention, a pen input/display device comprises:

an input pen enabling a pen input on a display panel;

an infrared transmission section and an ultrasonic transmission section provided on the input pen;

an infrared reception section and at least two ultrasonic reception sections, provided on the display panel, receiving an infrared signal and an ultrasonic signal simultaneously transmitted respectively from the infrared transmission section and the ultrasonic transmission section provided on the input pen, when a pen tip of the input pen is in contact with the display panel; and a display control section computing a contact position of the pen tip on the display panel from a result, containing a time delay, of receiving the ultrasonic signal by the at least two ultrasonic reception sections with reference to a time when the infrared reception section receives the infrared signal, the input pen including pen pressure sensor section sensing pen pressure when the pen tip is in contact with the display panel; and a pen pressure information infrared transmit control section controls the infrared transmission section to transmit the infrared signal which changes in accordance with the pen pressure.

According to an embodiment of the invention, the pen pressure information infrared transmit control section controls the infrared transmission section to transmit the infrared signal which changes in accordance with the pen pressure sensed by the pen pressure sensor section when the pen tip is in contact.

Therefore, pen pressure information from the input pen is transmitted on the infrared signal, hence wirelessly. Besides, since the pen input/display device already includes the infrared transmission section transmitting the infrared signal and the infrared reception section receiving the infrared signal, the pen input/display device does not need to incorporate no separate set of such a transmission section and a receiving section.

Hence, the resultant pen input/display device is capable of wirelessly transmitting information on sensed pen pressure to a device main body in ultrasonic pen input operation, in order to realize multifunctional, high performance pen input based on the pen pressure information in a simple manner.

Additional advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 5(a) to FIG. 5(c) are waveform charts showing infrared transmission waveforms representing pen pressure information periods which grow longer with increasing pen pressure.

FIG. 6(a) is a waveform chart showing an infrared transmission (reception) waveform representing pen pressure information, whereas FIG. 6(b) is a waveform chart showing an ultrasonic reception waveform based on which a travel time difference is derived.

FIG. 7(a) to FIG. 7(c) are waveform charts showing infrared transmission waveforms representing pen pressure information periods which grow shorter with increasing pen pressure.

FIG. 8(a) to FIG. 8(c) are waveform charts showing infrared transmission waveforms representing a long pen pressure information period for an intermediate level of pen pressure, an intermediate-length pen pressure information period for a low level of pen pressure, and a short pen pressure information period for a high level of pen pressure.

FIG. 9(a), illustrating another embodiment of the present invention, is a waveform chart showing an infrared transmission (reception) waveform in the case where two pulses the interval between which indicates pen pressure information are transmitted/received, whereas FIG. 9(b) is a waveform chart representing an ultrasonic reception waveform based on which a travel time difference in that case is derived.

FIG. 11(a), illustrating a further embodiment of the present invention, is a waveform chart showing an infrared transmission (reception) waveform representing pen pressure information in the case where the information is transmitted/received in the form of an 8-bit digital signal, whereas FIG. 11(b) is a waveform chart showing an ultrasonic reception waveform based on which a travel time difference in that case is derived.

FIG. 12(a) and FIG. 12(b) are waveform charts showing an infrared transmission waveform in the case where an 8-bit digital signal is transmitted indicating pen pressure information, "10100011."

FIG. 13(a) and FIG. 13(b) are waveform charts showing an infrared transmission waveform in the case where an 8-bit digital signal is transmitted indicating pen pressure information, "00000000."

FIG. 14(a) and FIG. 14(b) are waveform charts showing an infrared transmission waveform in the case where an 8-bit digital signal is transmitted indicating pen pressure information, "11111111."

FIG. 15(a) to FIG. 15(c) are waveform charts, in the case where pen pressure data is transmitted by pulse width, showing infrared transmission waveforms representing required pulse widths and pulse-to-pulse intervals which grow longer with an increasing quantity of pen pressure information (increasing grayscale level count).

FIG. 16(a) to FIG. 16(c) are waveform charts, in the case where pen pressure data is transmitted by pulse-to-pulse interval, showing infrared transmission waveforms representing required pulse widths and pulse-to-pulse intervals which grow longer with an increasing quantity of pen pressure information (increasing grayscale level count).

FIG. 18(a) is a plan view showing a conventional pen input/display device, whereas FIG. 18(b) is a front view showing an input pen for use with the pen input/display device.

DESCRIPTION OF THE EMBODIMENTS

Embodiment 1

The following will describe an embodiment of the present invention with reference to FIG. 1 through FIG. 8.

Figure 2:
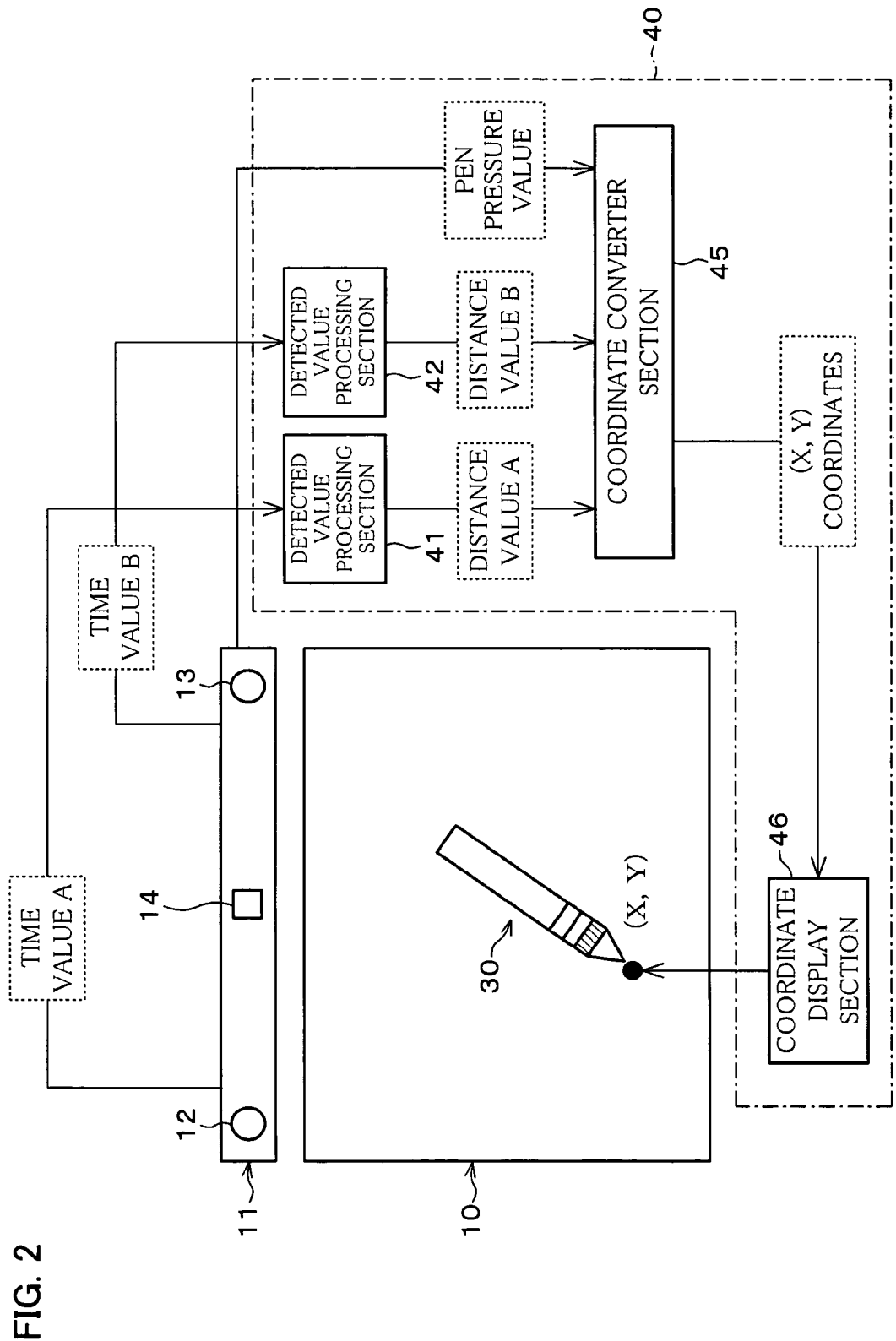
FIG. 2 is a schematic block diagram showing an overall arrangement of the pen input/display device.

A pen input/display device in accordance with the present embodiment is an example of the I/O-integrated display device allowing direct pen inputs on a display panel. As shown in FIG. 2, the device includes a display panel 10, a pen input unit 11, an input pen 30, and a display control section (display control means) 40.

Figure 18:
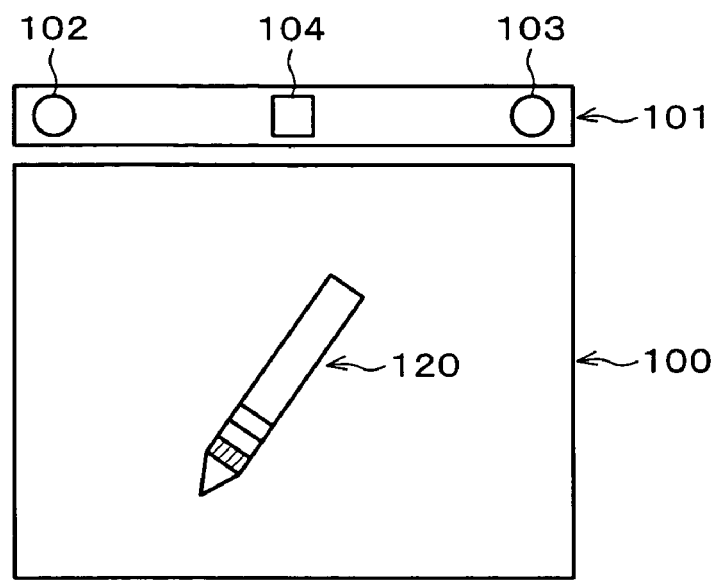
Figure 18:
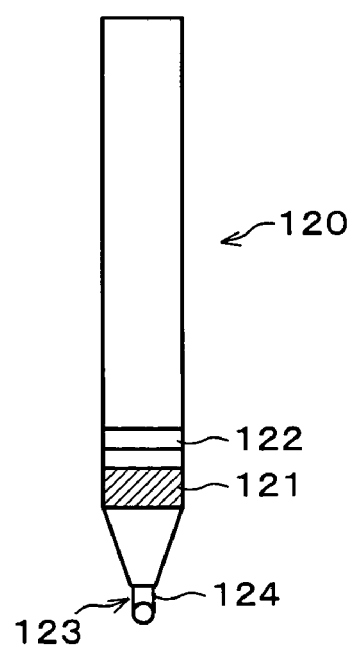
Figure 19:
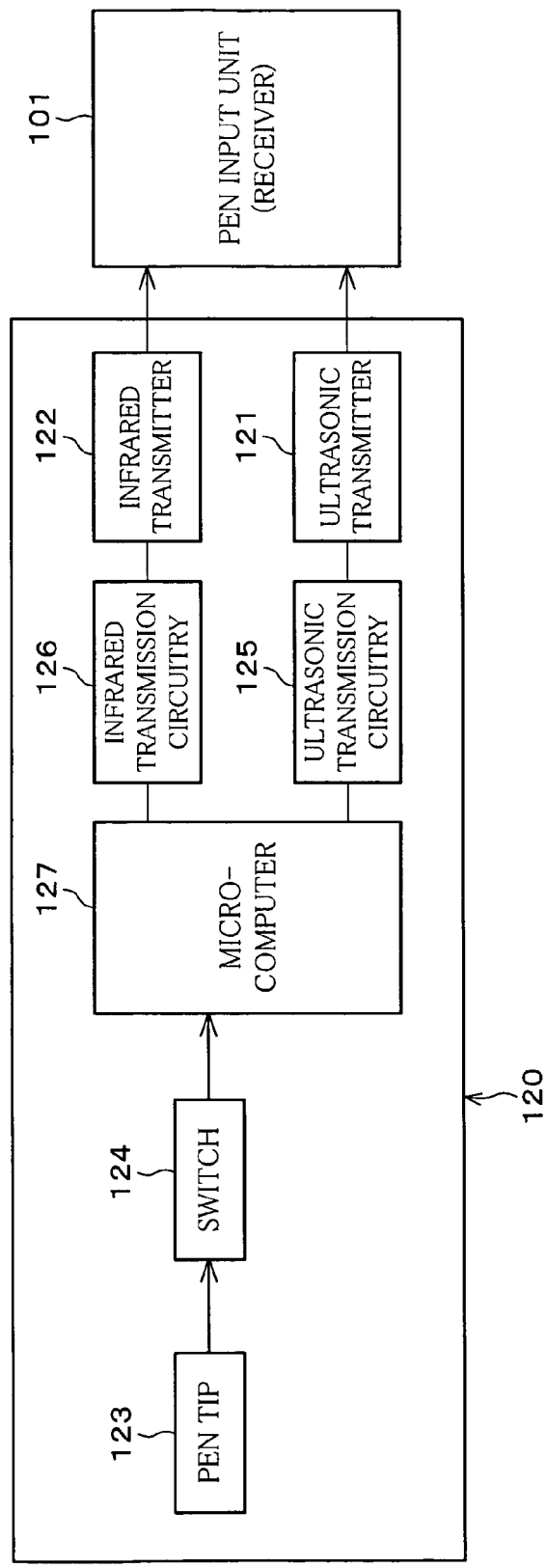
FIG. 19 is a block diagram showing the internal arrangement of the input pen.

Still referring to FIG. 2, the display panel 10 and the input pen 30 may be generally similar to the display panel 100 and the input pen 120 in FIG. 18(a) and FIG. 18(b) illustrating conventional art but include various differences discussed hereinafter.

Figure 3:
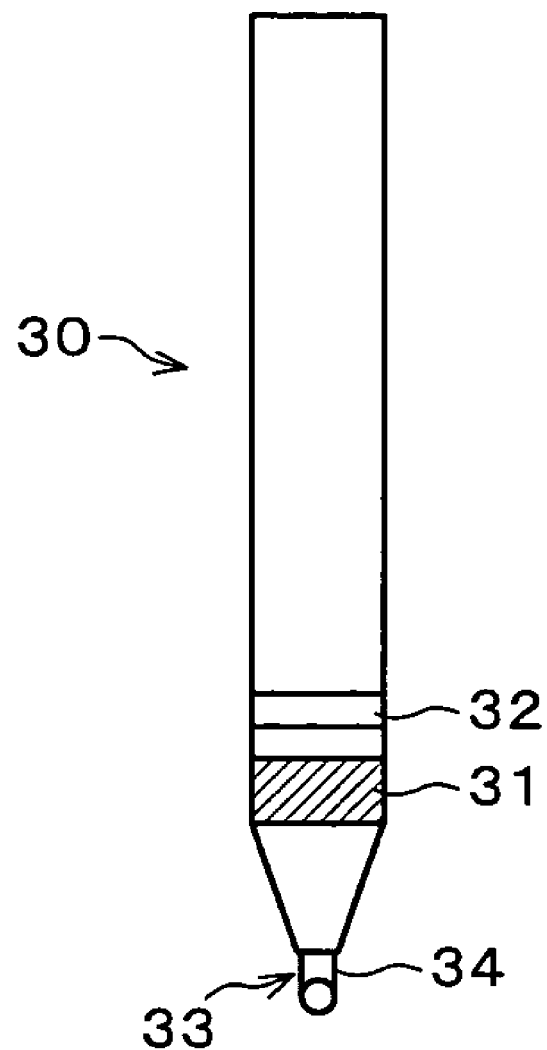
FIG. 3 is a front view showing an input pen for use with the pen input/display device.

In the pen input/display device, the pen input unit 11 is placed near the display panel 10. On the pen input unit 11 are two ultrasonic receivers 12, 13 and an infrared receiver 14. The input pen 30, as shown in FIG. 3, is equipped with an ultrasonic transmitter (ultrasonic transmission means) 31 and an infrared transmitter (infrared transmission means) 32. The input pen 30 has a pen tip 33 acting as a switch 34.

The ultrasonic receivers 12, 13 and the infrared receiver 14 on the pen input unit 11 may be located at other places than those shown in the FIG. 2 example, provided that they are along the periphery of the display panel 10.

The display control section 40, embodied by a CPU or like component, is provided for controlling displays on the display panel 10 in accordance with results of sensing by the pen input unit 11. The display control section 40 includes detected value processing sections 41, 42, a coordinate converter section 45, and a coordinates display processing section 46.

Figure 23:
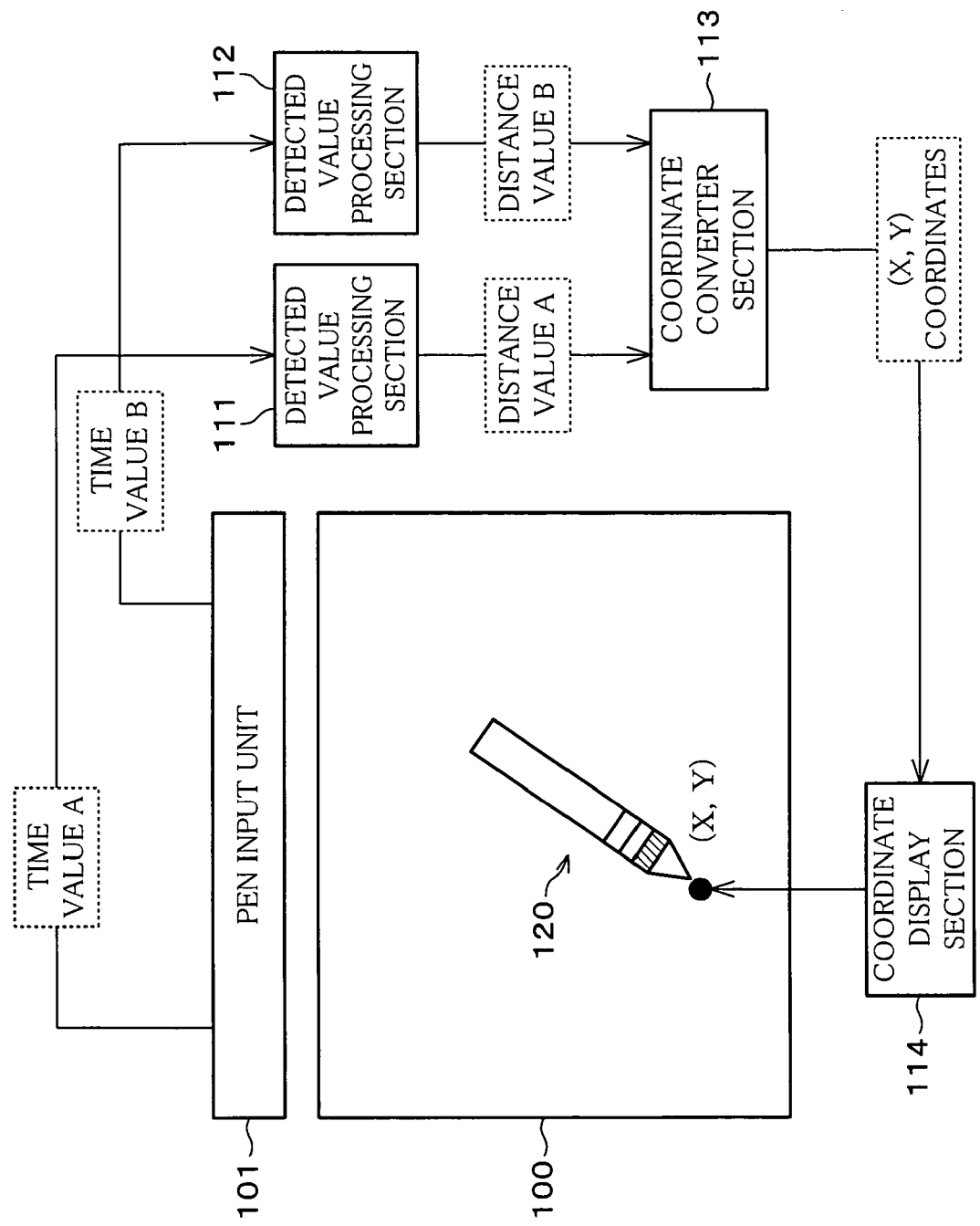
FIG. 23 is a block diagram showing an overall arrangement of the pen input/display device.

The detected value processing sections 41, 42, the coordinate converter section 45, and the coordinates display processing section 46 in FIG. 2 have the same arrangement, and operate in the same fashion, as the detected value processing sections 111, 112, the coordinate converter section 113, and the coordinates display processing section 114 in FIG. 23.

Next, processing operation of the pen input/display device having the arrangement will be described with reference to FIG. 4. The figure shows part of the arrangement of the pen input/display device relating to functionality of regulating the reception sensitivity of the pen input unit 11. The regulation aims at such high sensing accuracy at which operation errors hardly occur across the input area on the display panel 10. The arrangement includes the input pen 30, the pen input unit 11, and part of the display control section 40.

As the input pen 30 contacts the display panel 10, the built-in switch 34 on the pen tip 33 is turned on. Then, the ultrasonic transmitter 31 and the infrared transmitter 32 simultaneously send an ultrasonic signal and an infrared signal respectively. The ultrasonic receivers 12, 13 inside the pen input unit 11 individually measure a signal travel time the ultrasonic signal takes to reach a receiver after leaving the transmitter. The reception in the infrared receiver 14 of the infrared signal triggers the measurement of the signal travel time. The infrared is regarded as taking no time to reach the infrared receiver 14. The signal travel time is measured, for example, in terms of clock counts.

The ultrasonic signal received at the ultrasonic receivers 12, 13 is amplified in amplifier circuits 15, 16 and converted from analog to digital in A/D converter circuits 17, 18, before being transferred to a travel time difference count circuit 19.

Meanwhile, an infrared signal sent out from the infrared transmitter 32 simultaneously with the ultrasonic signal is received by the infrared receiver 14 and amplified in an amplifier circuit 20, before being transferred to the travel time difference count circuit 19 similarly to the ultrasonic signal.

The travel time difference count circuit 19 detects the signal travel times from the ultrasonic and infrared signal waveform inputs and transmits the signal travel times corresponding to the waveforms received at the ultrasonic receivers 12, 13 to detected value processing sections 41, 42 in the display control section 40 as time values A, B.

Figure 20:
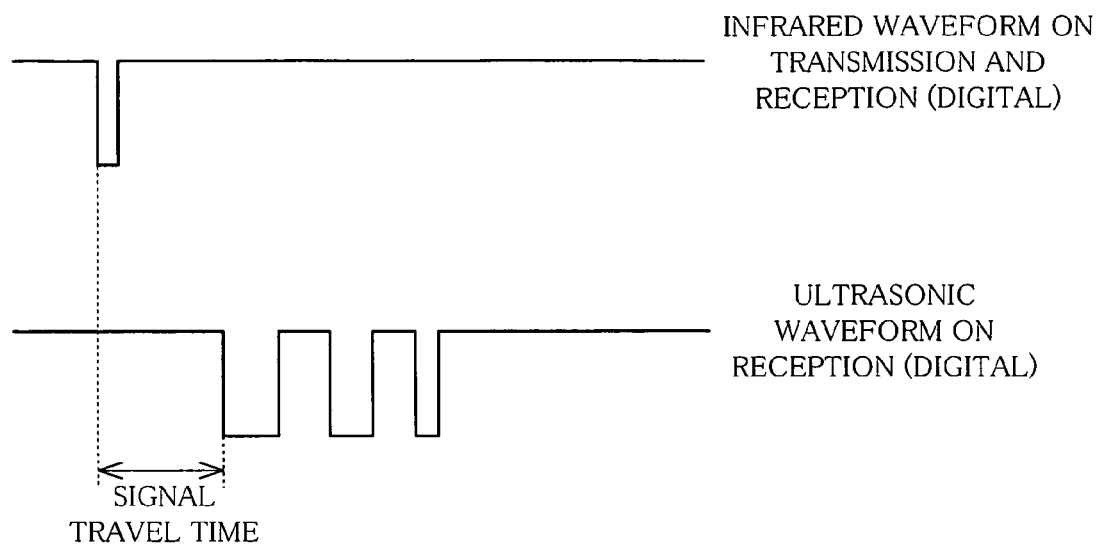
FIG. 20 is waveform charts showing a signal travel time for an ultrasonic signal used by the pen input/display device which is an application of ultrasonic pen input scheme.
Figure 21:
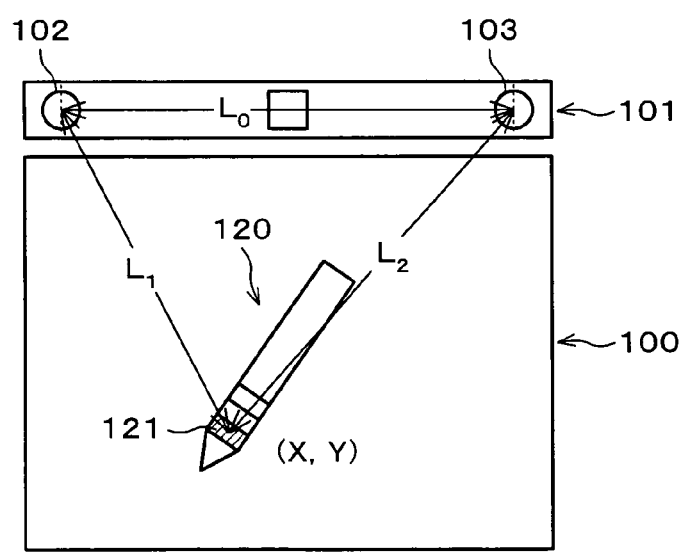
FIG. 21 is a plan view illustrating the principle in the calculation of an input coordinate position in the pen input/display device which is an application of ultrasonic pen input scheme.
Figure 22:
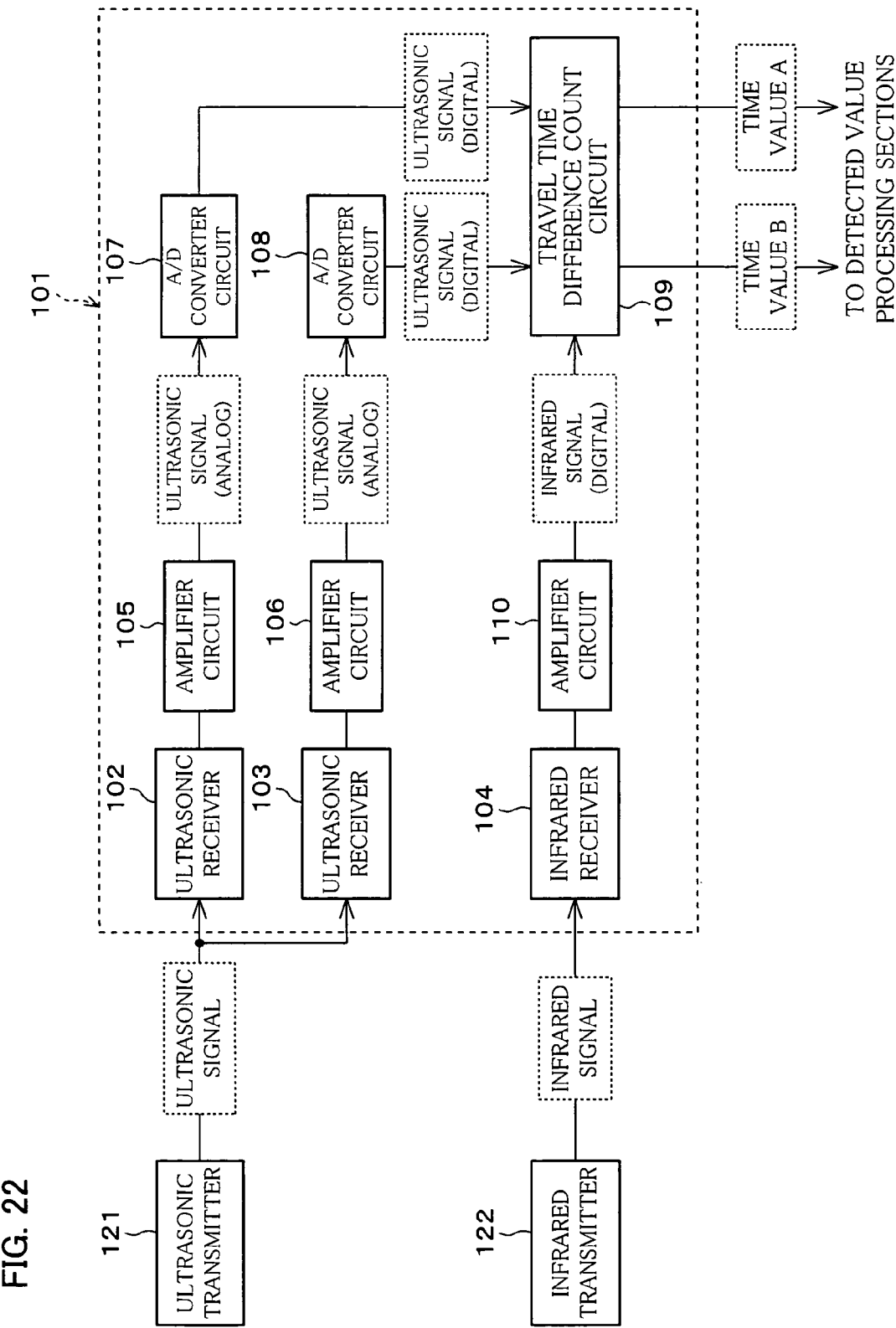
FIG. 22 is a block diagram showing the arrangement of a pen input unit for the pen input/display device which is an application of ultrasonic pen input scheme.

The time values A, B supplied to the detected value processing sections 41, 42 are converted to distance values A, B through computation by the detected value processing sections 41, 42 as shown in FIG. 2. In other words, distances are calculated between the ultrasonic transmitter 31 and the ultrasonic receivers 12, 13 from the time difference measurements and the speed of sound. The signal travel time difference refers to the time period from a rise in the infrared reception waveform to a fall in the ultrasonic reception waveform as shown in FIG. 20 which is a drawing depicting the conventional art. In the figure, the infrared reception/transmission waveform follows positive logic where an infrared's ON period is indicated by HIGH or a 1 while the ultrasonic reception waveform follows negative logic. The waveforms may follow other logic.

Thereafter, as shown in FIG. 2, the distance values A, B are converted to a set of coordinates (X, Y) on the display panel 10 by the coordinate converter section 45, before the positional coordinates are displayed on the display panel 10 by the coordinates display processing section 46.

In the present embodiment, the conversion of the distance values A, B to the coordinates (X, Y) on the display panel 10 by the coordinates display processing section 46 involves pen pressure information.

A feature of the pen input/display device in accordance with present embodiment 1 lies in the drive method that involves pen pressure information. The drive method will be described in more detail below.

In the drive scheme for the pen input/display device in accordance with the present embodiment, pen pressure information is transmitted by means of pulse width of an infrared signal.

Figure 1:
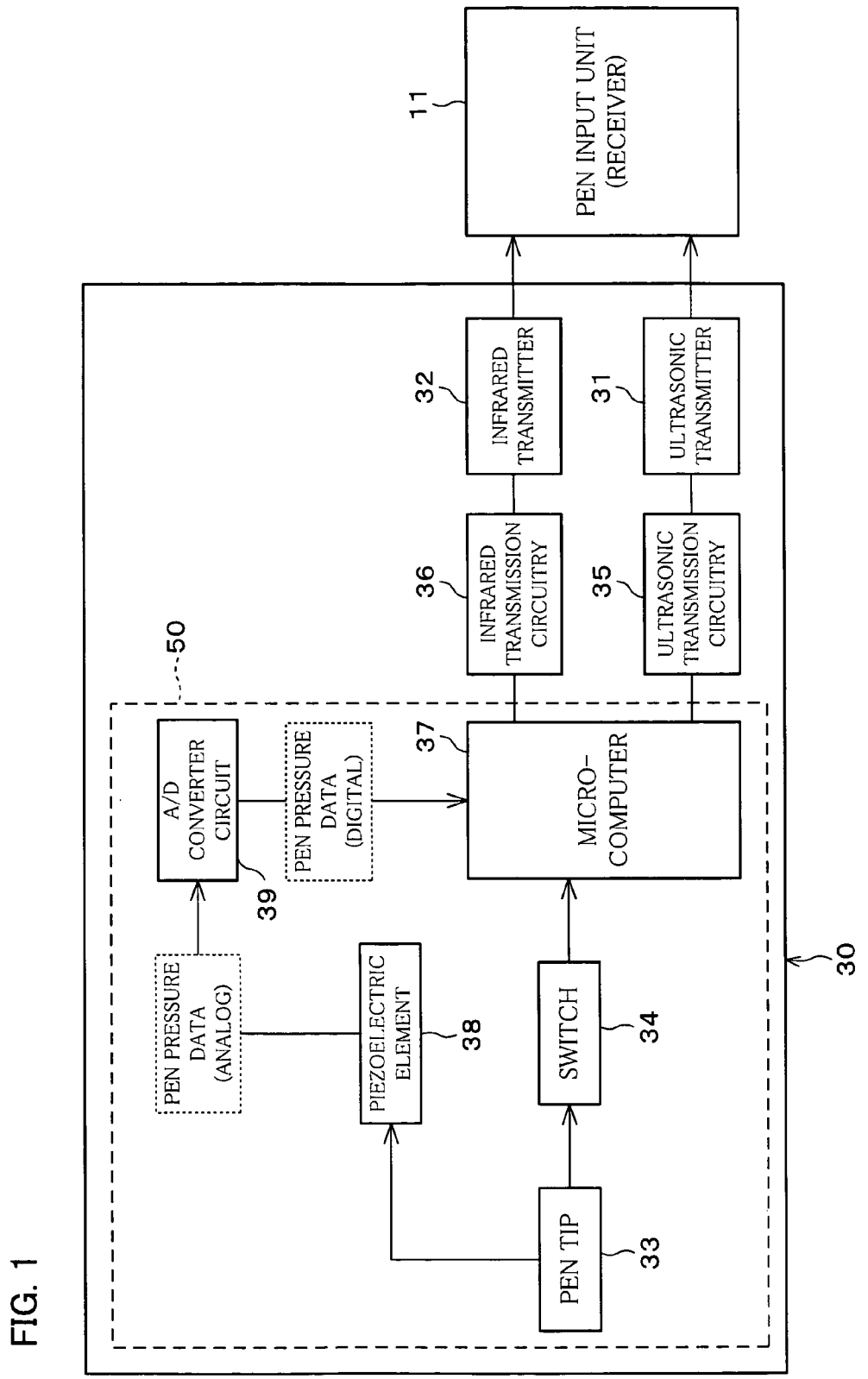
FIG. 1, illustrating an embodiment of the pen input/display device in accordance with the present invention, is a block diagram showing the arrangement of an input pen.

Specifically, in the pen input/display device in accordance with the present embodiment, the input pen 30 contains, as shown in FIG. 1, ultrasonic transmission circuitry 35 driving the ultrasonic transmitter 31; infrared transmission circuitry 36 driving the infrared transmitter 32; and a microcomputer (pen pressure information infrared transmission control means) 37 controlling outputs from the ultrasonic transmitter 31 and the infrared transmitter 32. In other words, under the control of the microcomputer 37, the ultrasonic transmitter 31 and the infrared transmitter 32 send a signal when the input pen 30 contacts the display panel 10, turning on the switch 34 on the pen tip 33.

Further, in the present embodiment, the input pen 30 is equipped with a piezoelectric element (an example of pen pressure sensor means) 38 and an A/D converter circuit 39 converting analog to digital pen pressure data from the piezoelectric element 38. The pen pressure sensor means is not necessarily the piezoelectric element 38. The A/D converter circuit 39 may be omitted if it is unnecessary.

The ultrasonic transmitter 31, infrared transmitter 32, ultrasonic transmission circuitry 35, infrared transmission circuitry 36, microcomputer 37, piezoelectric element 38, A/D converter circuit 39, and other components receive operational power from a built-in battery (not shown) inside the input pen 120.

In the input pen 30, the pen pressure at the pen tip 33 is sensed by the piezoelectric element 38, digitized in the A/D converter circuit 39, and fed to the microcomputer 37. On the basis of the pen pressure value input, the microcomputer 37 instructs an infrared output so that the pen pressure value is indicated by the pulse width of an infrared signal. For example, the infrared signal pulse width is varied greatly with increasing pen pressure in accordance with the information on the pen pressure at the pen tip 33 as shown in FIG. 5(*a*) to FIG. 5(*c*).

Figure 4:
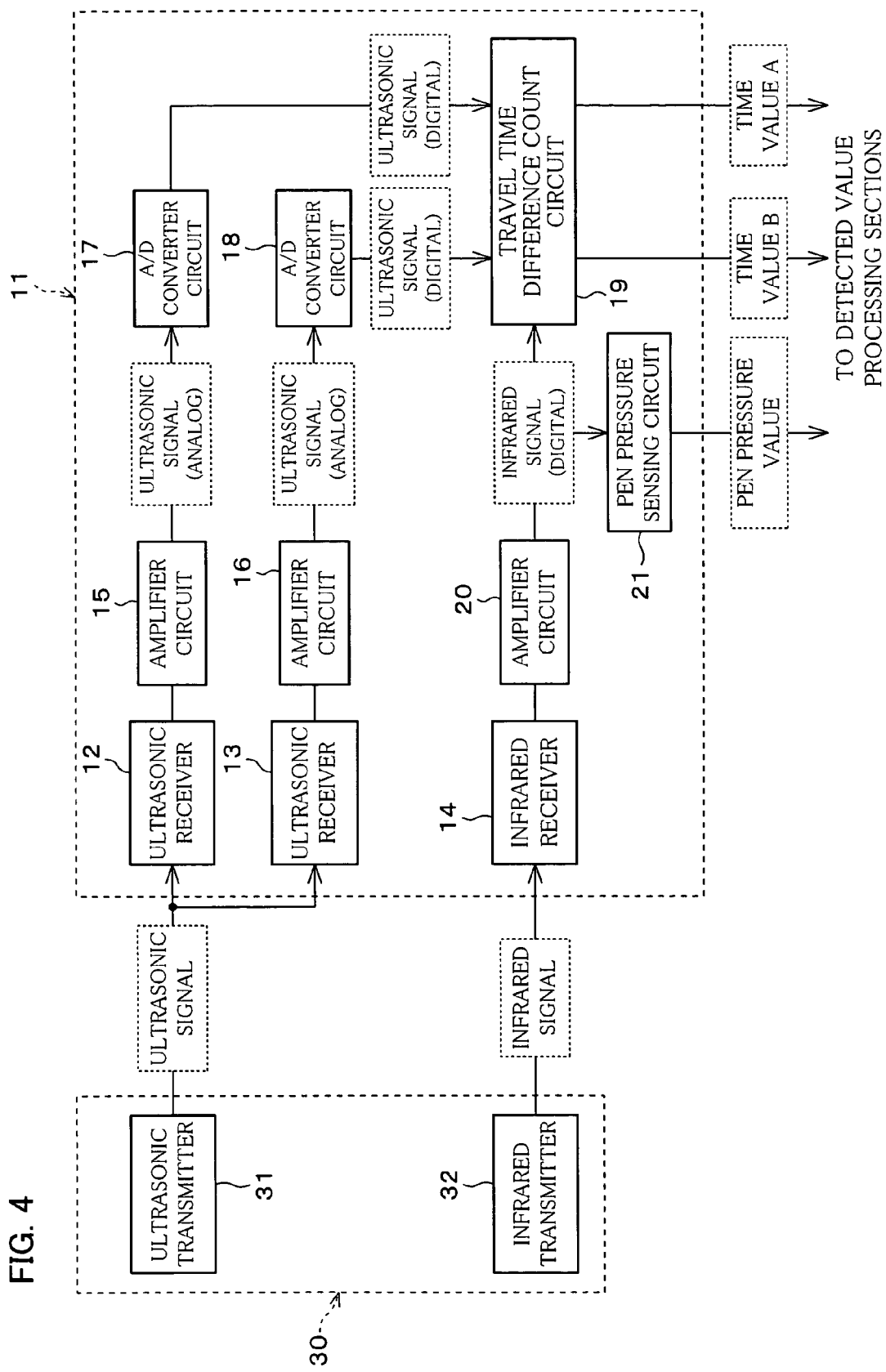
FIG. 4 is a block diagram showing the arrangement of a pen input unit in the pen input/display device.

In the infrared receiver 14, upon receipt of the infrared signal, the pen pressure sensing circuit (pen pressure sensor means) 21 derives pen pressure information based on the pulse width as shown in FIG. 4. The circuit 21 simultaneously calculates the distances from the ultrasonic transmitter 31 to the ultrasonic receivers 12, 13 based on the travel time difference between the infrared and ultrasonic signals as shown in FIGS. 6(*a*), 6(*b*).

Thereafter, as shown in FIG. 2, graphics are drawn on the display panel 10 based on the sensed pen pressure value and the calculated coordinates data.

The present embodiment so far has introduced a pulse width which increases with increasing pen pressure as shown in FIG. 5(*a*) through FIG. 5(*c*). Alternatively, for example, as shown in FIG. 7(*a*) through FIG. 7(*c*), the pulse width may be reduced with increasing pen pressure. In addition, the pen pressure information is not necessarily varied in a linear manner as shown in FIG. 8(*a*) through FIG. 8(*c*); the pulse width may be greatest when the pen pressure is on an intermediate level.

As mentioned earlier, the input pen 30 is driven by an internal battery. A serious issue occurs as to how to lower the power consumption in drive operation. Increases in operational power should be reduced to a minimum.

Accordingly, the period in which an infrared signal is being output is indicated by HIGH or a 1 (positive logic) as shown in FIG. 5(*a*) through FIG. 5(*c*), FIG. 7(*a*) through FIG. 7(*c*), and FIG. 8(*a*) through FIG. 8(*c*) in the present embodiment.

The pulse width corresponds to the duration of an infrared output period. A longer infrared output period means a greater power consumption. Therefore, assigning a narrow pulse width for frequently used pen pressure information will reduce increases in power consumption in drive operation.

Accordingly, in the present embodiment, for example, if inputs are frequently made through the pen without the pen tip 33 being fully pressed, assigning a narrow pulse width for low pen pressure, as in FIG. 5(a) through FIG. 5(c), will reduce power consumption in drive operation. In contrast, for example, if inputs are frequently made through the pen with the pen tip 33 being fully pressed, assigning a narrow pulse width for high pen pressure, as shown in FIG. 7(a) through FIG. 7(c), will reduce power consumption in drive operation.

Further, for example, if inputs are rarely made through the pen with the pen tip 33 being half pressed, assigning a wide pulse width for intermediate pen pressure, as shown in FIG. 8(a) through FIG. 8(c), will reduce power consumption in drive operation.

Moreover, for example, these settings may be rendered alterable for a user's preferences. When this is the case, specifically, the settings may be made alterable both on the input pen 30 and the receiving-end pen input unit 11.

An example method will be given below where the user, through the input pen 30, enters a series of pen pressure levels as sorted by frequency of use so that an infrared signal is transmitted with a shorter pulse width for a greater frequency.

When this is the case, a sequence input section 50, constituted by the pen tip 33, the switch 34, the piezoelectric element 38, the A/D converter circuit 39, and the microcomputer 37 in the input pen 30 in FIG. 1, serves as sequence input means in accordance with the present invention.

A method will be described next whereby settings are made through the sequence input section 50 in descending sequence of frequency of use of individual pen pressure levels.

For example, the user firmly pushes the pen tip 33 of the input pen 30 against the display panel 10 and releases the pen tip 33 from the display panel 10. The action turns on the switch 34 and the piezoelectric element 38, sending pen pressure information to the microcomputer 37 via the A/D converter circuit 39. If the pen pressure detected by the piezoelectric element 38 is equal to or in excess of a certain threshold value, the microcomputer 37 determines that it is being called on to operate in an input mode which enables the user to enter settings in descending sequence of frequency. Therefore, for example, to enter such settings that the frequency of use decreases as the pen pressure increases from low to intermediate and to high level as shown in FIG. 5(a) through FIG. 5(c), the user, for example, repeatedly pushes and releases the pen tip 33 of the input pen 30 at different pen pressures, starting from low level and moving to intermediate and to high level, in setting entry mode. Specifically, the user moves the pen tip 33 into contact with the display panel 10 and pushes the pen tip 33 for, for example, two seconds at a low pen pressure. Subsequently, the user temporarily releases the pen tip 33 off the display panel 10 before pushing the pen tip 33 for, for example, two seconds at an intermediate pen pressure. The pen tip 33 is similarly released temporarily off the display panel 10. The user then pushes for, for example, two seconds at a higher pen pressure before releasing off the display panel 10. In response to the action, the microcomputer 37 in the setting entry mode determines that the frequency of use decreases as the pen pressure increases from low to intermediate and to high level.

To get out of the setting entry mode, the user again pushes the pen tip 33 at a pressure equal to or in excess of a certain threshold value.

In response to the action, the microcomputer 37 determines that the frequency of use decreases as the pen pressure increases from low to intermediate and to high level, so that an infrared signal is transmitted with a shorter pulse width for a greater frequency as shown in, for example, FIG. 5(a) through FIG. 5(c).

The pen input/display device in accordance with the present embodiment has been so far described on an assumption that the pen input/display device is of an input/output integrated type allowing direct pen inputs on the display panel 10. The present invention is, however, not limited to input/output integrated types of pen input/display devices, but effectively applicable also to digitizers and other non-integrated input devices.

The display panel 10 is not limited to the liquid crystal display device, and may be, for example, a CRT (Cathode Ray Tube), a plasma display (PDP: Plasma Display Panel), or an OLED (Organic Light Emitting Diode) display device.

As discussed so far, the pen input/display device in accordance with the present embodiment includes: a piezoelectric element 38 as pen pressure sensor means for sensing pen pressure when the pen tip (sensing tip) 33 is in contact with the display panel (display device) 10; an input pen 30 which is input means having a built-in mechanism transmitting ultrasonic sound from the ultrasonic transmitter 31 and infrared light from the infrared transmitter 32; ultrasonic receivers 12, 13 as multiple ultrasonic reception means receiving the ultrasonic sound from the input pen 30; an infrared receiver 14 receiving the infrared light from the input pen 30; detected value processing sections 41, 42 which are sensing means deriving a sensing value from an information signal detected by the ultrasonic receivers 12, 13; a pen pressure sensing circuit 21 which is pen pressure sensing means deriving a pen pressure value from an information signal detected by the infrared receiver 14; a coordinate converter section 45 which is conversion means converting the sensing value to positional coordinates; and a coordinate converter section 45 which is positional coordinates display means displaying positional coordinates on the display panel 10 based on the positional coordinates. The pen input/display device is adapted to alter the width of an infrared signal pulse according to pen pressure information obtained through the input pen 30.

In other words, according to the present embodiment, the microcomputer 37 causes the infrared transmitter 32 to transmit an infrared signal which is altered in accordance with the pen pressure information obtained through the piezoelectric element 38 when the pen tip 33 is in contact.

The information on the pen pressure on the input pen 30 is transmitted in this manner on infrared light, hence wirelessly. Besides, since the pen input/display device already includes the infrared transmitter 32 transmitting the infrared signal and the infrared receiver 14 receiving the infrared signal, the pen input/display device does not need to incorporate no separate set of such a transmitter and receiver.

Hence, the resultant pen input/display device is capable of wirelessly transmitting information on sensed pen pressure to a device main body in ultrasonic pen input operation, in order to realize multifunctional, high performance pen input based on the pen pressure information in a simple manner.

Also, in the pen input/display device in accordance with the present embodiment, the microcomputer 37 causes the infrared transmitter 32 to transmit an infrared signal with a pulse width altered in accordance with the pen pressure information.

The alteration of the pulse width of the infrared signal in accordance with pen pressure levels enables the transmission of various pen pressure information.

Also, in the pen input/display device in accordance with the present embodiment, the input pen 30 includes the sequence input section 50 permitting the entering of a series of pen pressure levels as sorted by frequency of use. Meanwhile, the microcomputer 37 causes the infrared transmitter 32 to transmit an infrared signal with a pulse width which grows longer in descending sequence of frequency of use of individual pen pressure levels as sorted through the sequence input section 50.

The transmission of an infrared signal with a pulse width which grows longer in descending sequence of frequency of use of individual pen pressure levels enables simple, high performance pen input at low power while maintaining high display quality.

Embodiment 2

Figure 9:
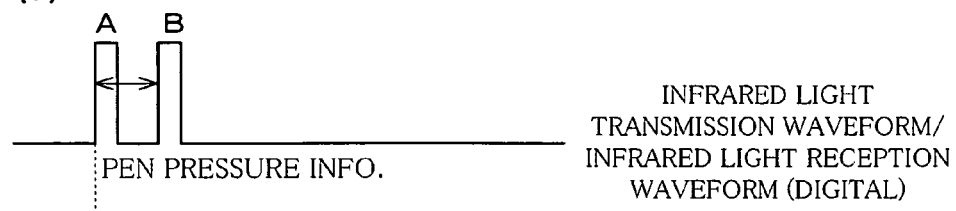
Figure 9:
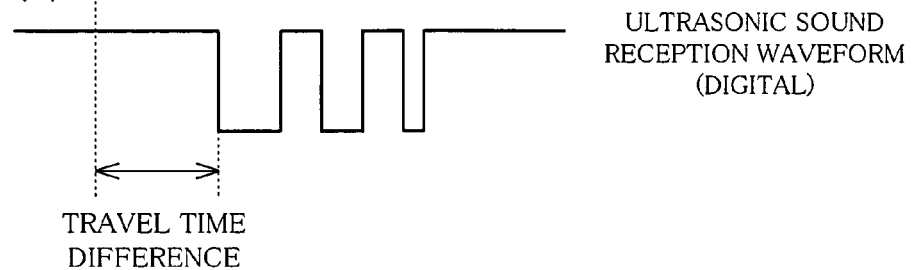
Figure 10:
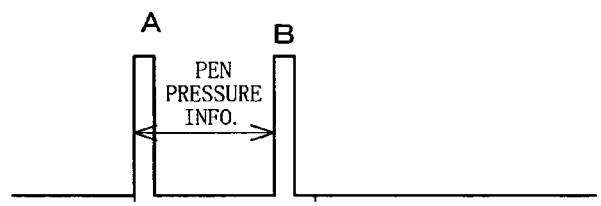
FIG. 10(a) to FIG. 10(c) are waveform charts showing infrared transmission waveforms representing two pulses the interval between which grows longer with an increasing pen pressure, the two pulses indicating a pen pressure information period.
Figure 10:
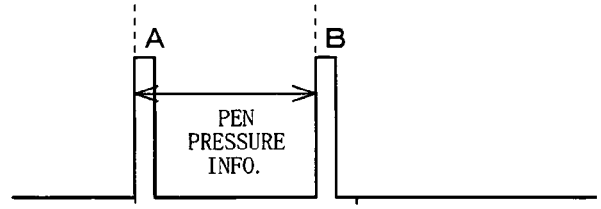
Figure 10:
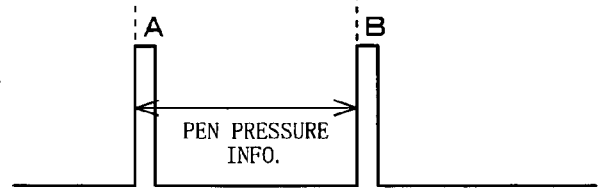
Figure 17:
FIG. 17(a) to FIG. 17(c) are waveform charts showing infrared transmission waveforms representing pen pressure information the quantity of which may increase without causing an extension of the data transmission period, owing to bit data transmission of pen pressure data.
Figure 17:
Figure 17:

The following will describe another embodiment of the present invention with reference to FIG. 9 and FIG. 10. The present embodiment has the same arrangement as embodiment 1 unless otherwise stated. Here, for convenience, members of the present embodiment that have the same arrangement and function as members of embodiment 1, and that are mentioned in that embodiment are indicated by the same reference numerals and description thereof is omitted.

A pen input/display device in accordance with the present embodiment conveys pen pressure information by means of the interval between two or more (here, two) infrared signal pulses transmitted within one sampling cycle as shown in FIG. 9(a) and FIG. 9(b).

In other words, as described in embodiment 1 with reference to FIG. 1, the pen pressure detected by the pen tip 33 is sensed by the piezoelectric element (pen pressure sensor means) 38 and if necessary, digitized in the A/D converter circuit 39 for output to the microcomputer 37. In accordance with the incoming pen pressure information, the microcomputer 37 alters the interval between a first infrared signal pulse A and a second infrared signal pulse B for infrared output as shown in FIG. 10(a) through FIG. 10(c).

Upon the receipt of the infrared signal pulses A, B in the pen input unit 11, the pen pressure sensing circuit 21 derives pen pressure information based on the interval between the infrared signal pulses A, B, and as shown in FIG. 4, simultaneously calculates the distances from the ultrasonic transmitter 31 to the ultrasonic receivers 12, 13 from the travel time difference between the infrared signal pulse A and the ultrasonic signal. Thereafter, graphics are drawn on the display panel 10 based on a pen pressure value and coordinates data as shown in FIG. 2.

If this drive scheme is employed, the infrared output period never varies with pen pressure. Power consumption for infrared output neither varies whatever the pen pressure. Power consumption is therefore kept low.

Constant power consumption does not necessarily mean that the pen pressure information must be changed in a linear fashion. The greatest pulse width may be assigned for intermediate pen pressure.

Moreover, for example, these settings may be rendered alterable for a user's preferences. When this is the case, specifically, the settings may be made alterable both on the input pen 30 and the receiving-end pen input unit 11.

The pen input/display device in accordance with the present embodiment has been so far described on an assumption that the pen input/display device is of an input/output integrated type allowing direct pen inputs on the display panel 10. The present invention is, however, not limited to input/output integrated types of pen input/display devices, but effectively applicable also to digitizers and other non-integrated input devices.

The display panel 10 is not limited to the liquid crystal display device, and may be, for example, a CRT (Cathode Ray Tube), a plasma display (PDP: Plasma Display Panel), or an OLED (Organic Light Emitting Diode) display device.

As discussed so far, the pen input/display device in accordance with the present embodiment includes: a piezoelectric element 38 as pen pressure sensor means for sensing pen pressure when the pen tip (sensing tip) 33 is in contact with the display panel (display device) 10; an input pen 30 which is input means having a built-in mechanism transmitting ultrasonic sound from the ultrasonic transmitter 31 and infrared light from the infrared transmitter 32; ultrasonic receivers 12, 13 as multiple ultrasonic reception means receiving the ultrasonic sound from the input pen 30; an infrared receiver 14 receiving the infrared light from the input pen 30; detected value processing sections 41, 42 which are sensing means deriving a sensing value from an information signal detected by the ultrasonic receivers 12, 13; a pen pressure sensing circuit 21 which is pen pressure sensing means deriving a pen pressure value from an information signal detected by the infrared receiver 14; a coordinate converter section 45 which is conversion means converting the sensing value to positional coordinates; and a coordinate converter section 45 which is positional coordinates display means displaying positional coordinates on the display panel 10 based on the positional coordinates. The pen input/display device is adapted to alter the interval between infrared signal pulses according to pen pressure information obtained through the input pen 30.

In other words, according to the pen input/display device in accordance with the present embodiment, the microcomputer 37 causes the infrared transmitter 32 to transmit at least two infrared signal pulses the interval between which is altered in accordance with the pen pressure information.

The alteration of the interval between the two infrared signal pulses in accordance with the pen pressure levels enables the transmission of various pen pressure information.

Also, a HIGH state does not exist for an extended period of time. Power consumption for infrared signal output is therefore kept low.

The present embodiment transmits various pen pressure information by altering the interval between the two infrared signal pulses. Therefore, at least two infrared signal pulses are necessary and sufficient. For example, the first infrared signal pulse A is used as a trigger indicating the beginning of an ultrasonic signal, whereas the interval between two succeeding infrared signal pulses represent pen pressure information. In this case, three infrared signal pulses are transmitted in all. In other words, the number of infrared signal pulses is not limited to two.

Embodiment 3

The following will describe another embodiment of the present invention with reference to FIG. 11 through FIG. 17. The present embodiment has the same arrangement as embodiments 1, 2 unless otherwise stated. Here, for convenience, members of the present embodiment that have the same arrangement and function as members of embodiments 1, 2 and that are mentioned in that embodiment are indicated by the same reference numerals and description thereof is omitted.

A pen input/display device in accordance with the present embodiment conveys pen pressure information by means of bit data represented by multiple infrared signal pulses transmitted within one sampling cycle as shown in FIG. 11(a) and FIG. 11(b). Specifically, bit data is transmitted by pulses other than an infrared signal pulse A as shown in FIG. 12(a) and FIG. 12(b). The pulse A constitutes a reference in detecting a travel time difference based on an ultrasonic signal. The figures show the transmission of 8-bit pen pressure information.

Upon the receipt of the infrared signal in the pen input unit 11, the pen pressure sensing circuit 21 detects a pen pressure sensing signal in synchronism with the infrared signal pulse A as shown in FIG. 4, and derives pen pressure information (bit data) from the pen pressure sensing signal, to calculate the distances from the ultrasonic transmitter 31 to the ultrasonic receivers 12, 13 from the travel time difference between the infrared signal pulse A and the ultrasonic signal.

Thereafter, as shown in FIG. 2, graphics are drawn on the display panel 10 on the basis of the sense pen pressure value and the calculated coordinates data.

In the drive scheme, multiple sets of infrared data are transmitted. So, similarly to embodiment 1, a serious issue occurs as to how to lower the power consumption in drive operation, i.e. how to shorten the infrared output period in actual use.

The present embodiment addresses the issue by setting infrared signal output periods which grow longer in descending sequence of frequency of use of individual pieces of pen pressure information.

To simplify the drive method, the pen pressure information is assumed to be 3 bits.

As to transmission of the data, since the pen pressure information is transmitted in 3 bits, the pen pressure information contains 8 levels, from 0 to 7.

Assume, for example, that when the input pen 30 is used, the frequently used pen pressure levels are, in descending sequence, 7, 6, 0, 1, 2, 5, 4, 3.

The bit data, 000, of which the infrared output period is the shortest, is assigned for the pen pressure information, 7, of which the frequency of use is the highest. The bit data, 100, 010, 001, of which the logical 1 output period occupies one of the three bits is assigned for the pen pressure information, 6, 0, 1, of which the frequency of use is the second highest.

Similarly, the bit data, 110, 011, 101, of which the logical 1 output period occupies two of the three bits is assigned for the pen pressure information, 2, 5, 4.

Lastly, the bit data, 111, which is most power consuming is assigned for the pen pressure information, 3, of which the frequency of use is the lowest.

These settings keep power consumption in infrared communications at low levels in actual use.

A specific transmission method is now described.

For example, if inputs are frequently made without the pen tip 33 fully pressed, data should be transmitted on a narrow pulse width as shown in FIG. 13(a) and FIG. 13(b) when the pen pressure is low.

In contrast, for example, if inputs are frequently made with the pen tip 33 fully pressed, data should be transmitted on a narrow pulse width as shown in FIG. 13(a) and FIG. 13(b) when the pen pressure is great.

Further, for example, if inputs are rarely made with the pen tip 33 being half pressed, data should be transmitted on a wide pulse as shown in FIG. 14(a) and FIG. 14(b) when the pen pressure is intermediate.

Moreover, for example, these settings may be rendered alterable for a user's preferences. When this is the case, specifically, the settings may be made alterable both on the input pen 30 and the receiving-end pen input unit 11. The setting method may be implemented in, for example, the sequence input section 50 described in embodiment 1.

In this manner, pen pressure data is transmitted regardless of the pulse width and pulse-to-pulse interval.

Incidentally, if the pen pressure is transmitted by means of pulse width or pulse-to-pulse interval, the necessary pulse width or pulse-to-pulse interval grows longer with increasing quantity of pen pressure information, i.e. increasing gray-scale level counts, as shown in FIGS. 15(a), 15(b), 16(a), and 16(b).

Therefore, at large quantities of pen pressure information, the pen pressure information cycle may inconveniently become longer than the sampling cycle. As a result, the sampling cycle must be extended in accordance with the pen pressure information. Such an extension leads to a shorter sampling cycle, which in turn lowers response speed and degrades smoothness in pen input operation.

To transmit pen pressure information in a short period, the clock frequency for the input pen 30 may be raised. The method does enable a short-period transmission of pen pressure information, but adds to power consumption due to the higher clock frequency. This is another inconvenience.

In the drive method in accordance with the present embodiment, since pen pressure data is transmitted in the form of bit data, increases in the quantity of the pen pressure information do not drastically add to the data transmission period as shown in FIG. 17(a) through FIG. 17(c).

High resolution pen pressure data can be therefore transmitted without shortening the sampling cycle. Pen input operation is attained with satisfactory response speed and smoothness.

The pen input/display device in accordance with the present embodiment has been so far described on an assumption that the pen input/display device is of an input/output integrated type allowing direct pen inputs on the display panel 10. The present invention is, however, not limited to input/output integrated types of pen input/display devices, but effectively applicable also to digitizers and other non-integrated input devices.

The display panel 10 is not limited to the liquid crystal display device, and may be, for example, a CRT (Cathode Ray Tube), a plasma display (PDP: Plasma Display Panel), or an OLED (Organic Light Emitting Diode) display device.

As discussed so far, the pen input/display device in accordance with the present embodiment includes: a piezoelectric element 38 as pen pressure sensor means for sensing pen pressure when the pen tip (sensing tip) 33 is in contact with the display panel (display device) 10; an input pen 30 which is input means having a built-in mechanism transmitting ultrasonic sound from the ultrasonic transmitter 31 and infrared light from the infrared transmitter 32; ultrasonic receivers 12, 13 as multiple ultrasonic reception means receiving the ultrasonic sound from the input pen 30; an infrared receiver 14 receiving the infrared light from the input pen 30; detected value processing sections 41, 42 which are sensing means deriving a sensing value from an information signal detected by the ultrasonic receivers 12, 13; a pen pressure sensing circuit 21 which is pen pressure sensing means deriving a pen pressure value from an information signal detected by the infrared receiver 14; a coordinate converter section 45 which is conversion means converting the sensing value to positional coordinates; and a coordinate converter section 45 which is positional coordinates display means displaying positional coordinates on the display panel 10 based on the positional coordinates. The pen input/display device is adapted to output multiple infrared signal pulses according to pen pressure information obtained through the input pen 30.

In other words, in the pen input/display device in accordance with the present embodiment, the microcomputer 37 outputs multiple infrared signal pulses in accordance with pen pressure information.

Therefore, for example, various pen pressure information can be transmitted by transmitting a infrared signal composed of pulses of different kinds in a certain period.

In the pen input/display device in accordance with the present embodiment, the infrared signal is a signal representing bit data. For example, 8 levels of grayscale (pen pressure information) can be transmitted using 3 bits. That is, 8 levels of grayscale (pen pressure information) can be transmitted in as short as a 3-bit transmission time.

Therefore, many different kinds of pen pressure information can be transmitted in a short transmission time.

In the pen input/display device in accordance with the present embodiment, the input pen 30 is provided with the sequence input section 50 allowing inputs of a series of pen pressure levels as sorted by frequency of use. Meanwhile, under the control of the microcomputer 37, the infrared transmitter 32 transmits an infrared signal the infrared signal output periods for which grow longer in descending sequence of frequency of use of individual pen pressure levels as sorted through the sequence input section 50.

Thus, the infrared signal is transmitted with such settings that the infrared signal output period grows longer in descending sequence of frequency of use of individual pen pressure levels as sorted through the sequence input section 50. This enables simple and high performance pen input operation at low power, while maintaining high display quality.

The present invention is not limited to the aforementioned embodiments. The scope of the present invention encompasses other embodiments which are suitable combinations of technological means disclosed in different embodiments.

As in the foregoing, the pen input/display device in accordance with embodiments of the present invention is the aforementioned pen input/display device, wherein the pen pressure information infrared transmission control means alters the pulse width of an infrared signal pulse in accordance with pen pressure information for transmission from the infrared transmission means.

Thus, the pulse width of an infrared signal is alterable in accordance with the magnitude of pen pressure; therefore various pen pressure information can be transmitted.

The pen input/display device in accordance with an embodiment of the present invention is the aforementioned pen input/display device, wherein the input pen is provided with sequence input means enabling inputs of a sequence of frequency of use of individual pen pressure levels. Meanwhile, the pen pressure information infrared transmission control means controls the infrared transmission means to transmit an infrared signal the pulse widths of which grow longer in descending sequence of frequency of use of individual pen pressure levels as sorted through the sequence input means.

According to an embodiment of the invention, the infrared signal is transmitted with pulse widths which grow longer in descending sequence of frequency of use of individual pen pressure levels. This enables simple and high performance pen input operation at low power, while maintaining high display quality.

The pen input/display device in accordance with an embodiment of the present invention is the aforementioned pen input/display device, wherein under the control of the pen pressure information infrared transmission control means, the infrared transmission means transmits at least two infrared signal pulses at an interval which alters in accordance with pen pressure information.

Thus, the interval between the two infrared signal pulses is alterable in accordance with the magnitude of pen pressure; therefore, by altering the interval between the infrared signal pulses, various pen pressure information can be transmitted.

Also, a HIGH state does not exist for an extended period of time. Power consumption for infrared signal output is therefore kept low.

Various embodiments of the present invention transmit various pen pressure information by altering the interval between the two infrared signal pulses. Therefore, at least two infrared signal pulses are necessary and sufficient. For example, the first infrared signal is used as a trigger indicating the beginning of an ultrasonic signal, whereas the interval between two succeeding infrared signal pulses represent pen pressure information. In this case, three infrared signal pulses are transmitted in all. In other words, the number of infrared signal pulses is not limited to two.

The pen input/display device in accordance with embodiments of the present invention is the aforementioned pen input/display device, wherein the pen pressure information infrared transmission control means outputs multiple infrared signal pulses in accordance with pen pressure information.

Therefore, various pen pressure information can be transmitted by, for example, transmitting a infrared signal composed of multiple pulses of different kinds in a certain period.

The pen input/display device in accordance with embodiments of the present invention is the aforementioned pen input/display device, wherein the infrared signal is composed of pulses representing bit data.

According to an embodiment of the invention, the infrared signal is a signal representing bit data. For example, 8 levels of grayscale (pen pressure information) can be transmitted using 3 bits. That is, 8 levels of grayscale (pen pressure information) can be transmitted in as short as a 3-bit transmission time.

Therefore, many different kinds of pen pressure information can be transmitted in a short transmission time.

The pen input/display device in accordance with an embodiment of the present invention is the aforementioned pen input/display device, wherein the input pen includes sequence input means for allowing for inputs of a series of pen pressure levels as sorted by frequency of use, and the pen pressure information infrared transmission control means controls the infrared transmission means to transmit the infrared signal the infrared signal output periods of which grow longer in descending sequence of frequency of use of individual pen pressure levels as sorted through the sequence input means.

According to an embodiment of the invention, the infrared signal is transmitted over an infrared signal output period which grow longer in descending sequence of frequency of use of individual pen pressure levels as sorted through the sequence input means. This enables simple and high performance pen input operation at low power, while maintaining high display quality.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A pen input/display device, comprising:
   an input pen enabling a pen input on a display panel;
   infrared transmission means and ultrasonic transmission means provided on the input pen;
   infrared receive means and at least two ultrasonic reception means, provided on the display panel, receiving an infrared signal and an ultrasonic signal simultaneously transmitted respectively from the infrared transmission means and the ultrasonic transmission means provided on the input pen, when a pen tip of the input pen is in contact with the display panel; and display control means computing a contact position of the pen tip on the display panel from a result, containing a time delay, of receiving the ultrasonic signal by the at least two ultrasonic reception means with reference to a time when the infrared receive means receives the infrared signal, said input pen including pen pressure sensor means sensing pen pressure when the pen tip is in contact with the display panel; and pen pressure information infrared transmission control means controls the infrared transmission means to transmit an infrared signal which changes in accordance with the pen pressure, wherein the input pen further includes sequence input means enabling inputs of a series of pen pressure levels in an order of frequency of use; and the pen pressure information infrared transmission control means controls the infrared transmission means to change the infrared signal in accordance with frequency of use of individual pen pressure levels as sorted through the sequence input means.

2. The pen input/display device as set forth in claim 1, wherein the pen pressure information infrared transmission control means controls the infrared transmission means to transmit the infrared signal with varied pulse widths in accordance with the pen pressure.

3. The pen input/display device as set forth in claim 1, wherein the pen pressure information infrared transmission control means controls the infrared transmission means to transmit at least two infrared pulses an interval between which changes in accordance with the pen pressure.

4. The pen input/display device as set forth in claim 1, wherein the pen pressure information infrared transmission control means outputs multiple successive infrared signal pulses in accordance with the pen pressure.

5. The pen input/display device as set forth in claim 4, wherein:

the pen pressure information infrared transmission control means controls the infrared transmission means to transmit the infrared signal over infrared signal output periods which grow longer in descending sequence of frequency of use of individual pen pressure levels as sorted through the sequence input means.

6. The pen input/display device as set forth in claim 1, wherein the infrared signal represents bit data.

7. The pen input/display device as set forth in claim 6, wherein:

the pen pressure information infrared transmission control means controls the infrared transmission means to transmit the infrared signal over infrared signal output periods which grow longer in descending sequence of frequency of use of individual pen pressure levels as sorted through the sequence input means.

8. A pen input/display device, comprising:

an input pen enabling a pen input on a display panel;

infrared transmission means and ultrasonic transmission means provided on the input pen;

infrared receive means and at least two ultrasonic reception means, provided on the display panel, receiving an infrared signal and an ultrasonic signal simultaneously transmitted respectively from the infrared transmission means and the ultrasonic transmission means provided on the input pen, when a pen tip of the input pen is in contact with the display panel; and display control means computing a contact position of the pen tip on the display panel from a result, containing a time delay, of receiving the ultrasonic signal by the at least two ultrasonic reception means with reference to a time when the infrared receive means receives the infrared signal, said input pen including pen pressure sensor means sensing pen pressure when the pen tip is in contact with the display panel; and pen pressure information infrared transmission control means controls the infrared transmission means transmit the infrared signal which changes in accordance with the pen pressure, wherein the pen pressure information infrared transmission control means controls the infrared transmission means to transmit the infrared signal with varied pulse widths in accordance with the pen pressure, and wherein:

the input pen further includes sequence input means enabling inputs of a series of pen pressure levels as sorted by frequency of use; and the pen pressure information infrared transmission control means controls the infrared transmission means to transmit the infrared signal with pulse widths which grow longer in descending sequence of frequency of use of individual pen pressure levels as sorted through the sequence input means.

9. A method of transmitting a signal from an input pen to a display device comprising the steps of:

providing a display device having an infrared receiver and an ultrasonic receiver;

providing an input pen including an infrared transmitter for transmitting an infrared signal, an ultrasonic transmitter for transmitting an ultrasonic signal, and a pen pressure sensor sensing pen pressure against the display and producing a pressure signal related to pen pressure against the display;

transmitting an infrared signal and an ultrasonic signal when the input pen contacts the display;

determining a location of pen contact on the display from the infrared signal and the ultrasonic signals; and varying the infrared signal in response to a user input related to a frequency of use of pressure levels and in response to changes in pen pressure against the display;

the method further including the additional steps of:

establishing a series of pen pressure levels;

ordering the pen pressure levels based on frequency of use; and associating each of the pen pressure levels with an infrared signal pulse width such that a more frequently used pen pressure level has a shorter pulse width than a pulse width of a less frequently used pen pressure.

* * * * *